United States Patent [19]
Testea

[11] Patent Number: 5,235,945
[45] Date of Patent: Aug. 17, 1993

[54] ROTARY ENGINE SYSTEM

[76] Inventor: George Testea, 77A Loomis Dr., West Hartford, Conn. 06107

[21] Appl. No.: 811,538

[22] Filed: Dec. 20, 1991

[51] Int. Cl.⁵ .................. F02B 53/04; F01C 1/332; F04C 18/332
[52] U.S. Cl. .......................... 123/235; 417/204; 418/173; 418/187; 418/256
[58] Field of Search ............... 123/214, 23 J; 418/186, 418/187, 188, 173, 256; 417/204

[56] References Cited

U.S. PATENT DOCUMENTS

| | | | |
|---|---|---|---|
| 1,269,735 | 6/1918 | Ogden | 418/187 |
| 1,518,812 | 12/1924 | Olson | 418/187 X |
| 2,511,441 | 6/1950 | Loubiere | 123/235 |
| 3,059,430 | 10/1962 | Talbot | 123/214 |
| 3,516,769 | 6/1970 | Korhonen | 418/188 X |
| 3,585,973 | 6/1971 | Klover | 418/187 X |

FOREIGN PATENT DOCUMENTS

| | | | |
|---|---|---|---|
| 1382139 | 11/1964 | France | 418/188 |
| 227885 | 1/1925 | United Kingdom | 428/187 |

*Primary Examiner*—Michael Koczo
*Attorney, Agent, or Firm*—Ira S. Dorman

[57] ABSTRACT

The power and compressor units of an internal combustion rotary engine system utilize a rotor assembly, concentrically mounted on a stationary distributor core member, for rotation about an axis eccentric to the central axis of a cylindrical cavity that provides the working chamber of the unit. Three vanes are disposed in the body of the rotor assembly for slidable movement in a radial direction, which engage the cylindrical surface disposed eccentrically thereabout so as to define chambers of dynamically increasing and decreasing volume as the rotor assembly operates. The core member functions as a valve, permitting or preventing the flow of air into the compartments defined by the vanes in a sequence that is timed to establish air introduction, compression, combustion (in the power unit) and exhaust phases of the operating cycle. In certain embodiments, the surface that cooperates with the vanes may be provided by a shell that is also mounted for rotation within the engine block. The rotor body and the cooperating shell member of such a power unit may be configured to define expanded areas for reaction to the explosive forces generated, and spaces under the vanes may be utilized as pneumatic chambers, assisting in the outward movement of the vanes or affording increased air compression capacity.

14 Claims, 6 Drawing Sheets

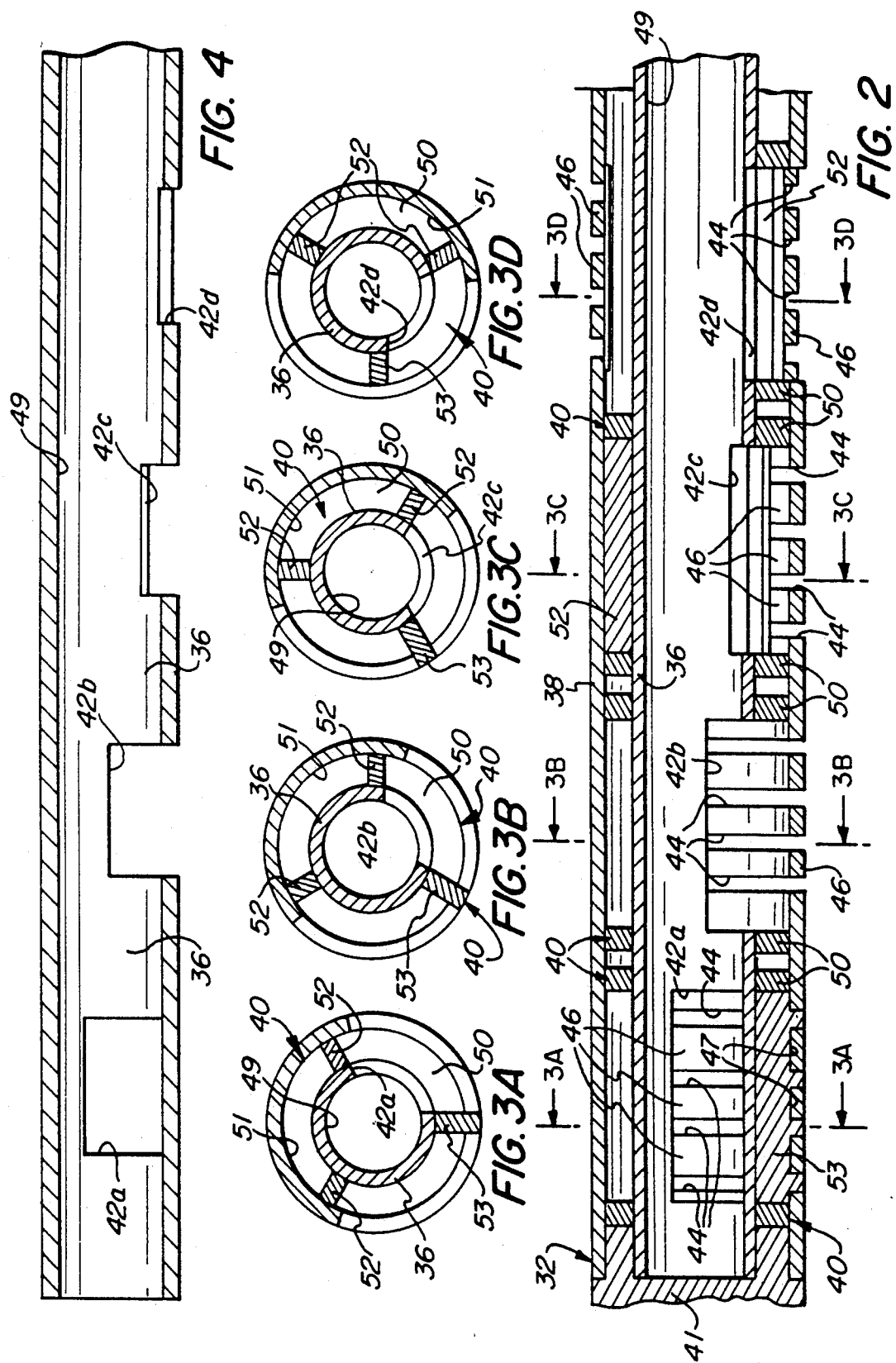

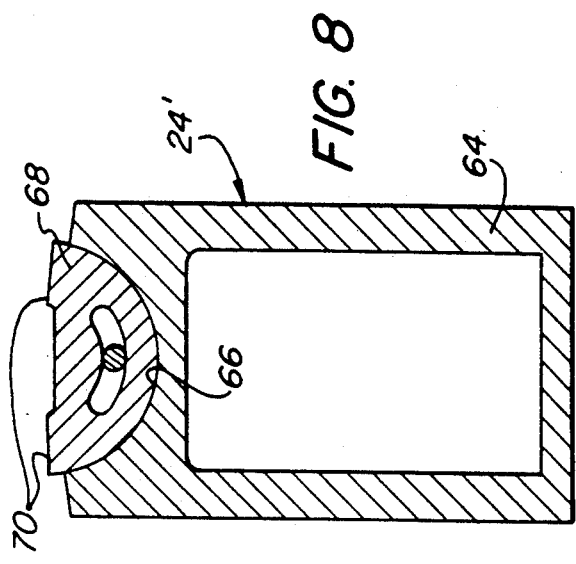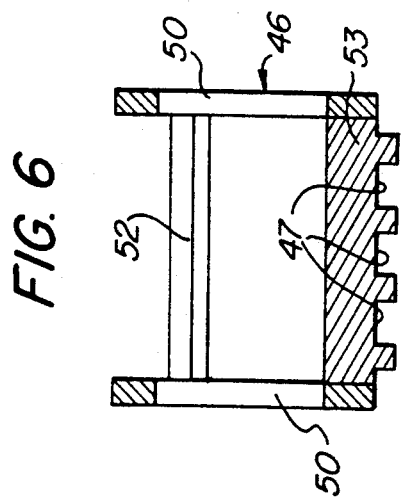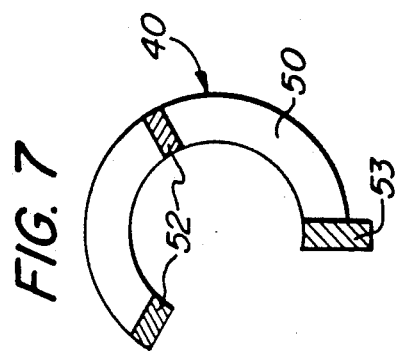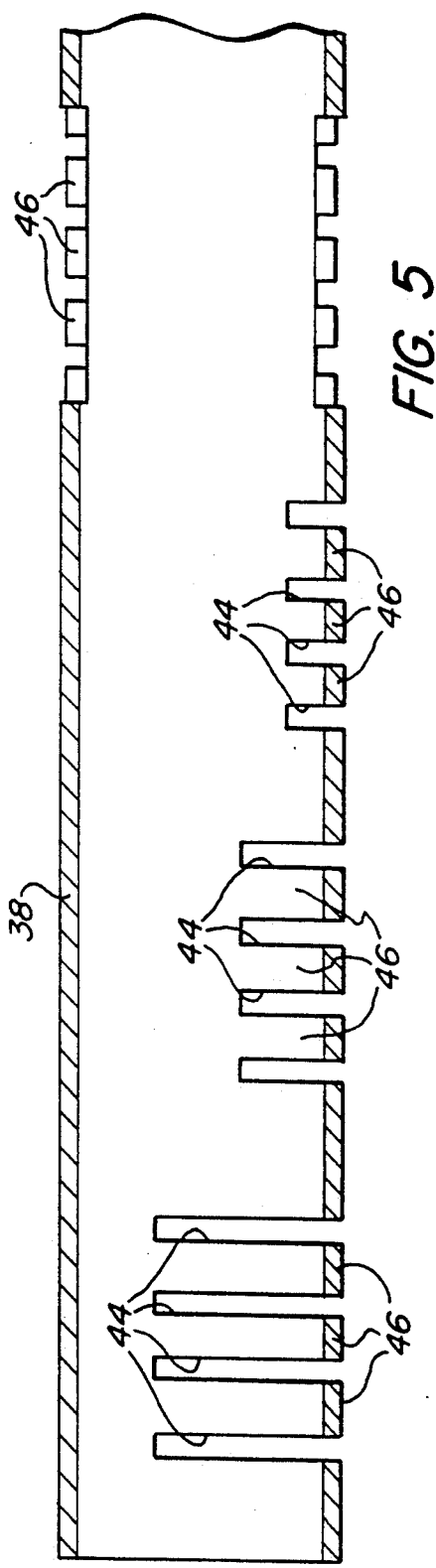

ROTARY ENGINE SYSTEM

BACKGROUND OF THE INVENTION

Rotary internal combustion engines are of course disclosed in the art, and are commercially available. It is well known that they offer certain inherent advantages over reciprocating IC engines, particularly insofar as power output and efficiency are concerned, attributable largely to the avoidance of the directional changes that characterize the movement of reciprocating pistons. There is nevertheless substantial need for improvement in the efficiency and operation of rotary engines.

It is therefore a broad object of the present invention to provide a novel rotary internal combustion engine, and a novel engine system comprising the same, which affords increased power output and efficiency together with improved operating characteristics.

Related and attendant objects are to provide such an engine and system in which size, weight, complexity, and lubrication and maintenance requirements are reduced, and in which smoothness of operation and flexibility of use are increased.

It is also an object of the invention to provide a novel compressor unit that operates in a highly efficient and effective manner, and that is similarly advantageous from standpoints of size, weight, complexity, and the like.

Other objects are to provide an engine, a compressor, and a system having the foregoing features and advantages, which require relatively few moving parts and which are relatively inexpensive and facile to manufacture.

SUMMARY OF THE DISCLOSURE

It has now been found that certain of the foregoing and related objects of the invention are attained by the provision of a rotary machine, comprising: a stator body having a cylindrical cavity therewithin; internal sidewall structure and end wall structure defining a closed chamber within the stator body cavity; a rotor assembly rotatably mounted within the stator body, including of an elongate rotor body having a central, longitudinal axis of rotation along which extends a bore of circular cross section; and an elongate distributor core member received within the bore of the rotor body. Three vane members extend longitudinally along the rotor body, at equiangularly spaced locations thereabout; they are mounted to extend beyond the outer surface of the rotor body, between the chamber-defining end wall structures, and for slidable movement radially with respect to the longitudinal axis thereof. The vane members effectively divide the rotor body longitudinally into three substantially identical sectors, and they have outer end portions that engage the internal sidewall structure to divide the chamber into three compartments, each having a volume that varies cyclically as the rotor assembly rotates within the stator body. The distributor core member is of generally circular cross section and is supported to enable rotation of the rotor assembly thereabout, the axis of rotation thereof being parallel to and offset from the longitudinal axis of the stator body cavity, so as to dispose the rotor body and the core member eccentrically with respect to the cavity. At least one duct extends through each sector of the rotor body, and provides fluid flow communication between the rotor bore and the stator body chamber; each duct has an inner end opening on a surface defining the bore, and an outer end opening on the rotor body outer surface. The core member defines two discrete passages, and includes an outer, generally cylindrical surface portion that lies in contact with the inner surface of the rotor body and effectively closes the inner ends of the ducts when it is in registry with them. The surface portion is of a discontinuous nature, thus providing an orifice of circumferential extend that is also disposed for registry with the inner ends of the ducts. Internal structure of the core member defines and isolates its passages, while also establishing independent communication of its surface orifice therewith.

In one form of the machine the internal sidewall structure will be fixed within the stator body and the closed chamber defined will comprise the cylindrical cavity thereof, with the outer end portions of the vane members slidably engaging the inner surface of the sidewall structure during rotation of the rotor assembly. In another form, the internal sidewall structure will be provided by a hollow shell member that is rotatably mounted within the stator body cavity, in which case the outer end portions of the vane members will be operatively, pivotably attached to the shell member to couple it to the rotor assembly for conjoint rotation.

The vane members may be freely slidable within the rotor body, and means may be provided for biasing them outwardly thereof. To provide such means, the rotor body may be formed with sockets for slidably mounting the vane members, with the surfaces defining the sockets, and the inner ends of the vane members, cooperatively forming pneumatic chambers. Such a rotor body will also have at least one supplemental duct, leading from its outer surface to each of the pneumatic chambers, for supplying fluid under pressure thereto and thereby providing the vane-biasing means. The same features may serve to generate additional charges of fluid under pressure, by utilization of the compressive effects produced by movement of the vane members into their respective pneumatic chambers, with the pressurized fluid thereby generated being discharged through the supplemental ducts.

In an especially preferred embodiment of the machine, the rotor body may be of trigonal cross section and trilaterally symmetric about its longitudinal axis. Each of the sectors of such a rotor body will include, in cross section, a generally arcuate outer surface portion, commencing proximate one of the vane members (normally adjacent its leading face, in a rotary sense), and a generally rectilinear outer surface portion extending tangentially therefrom to a point proximate the adjacent vane member (normally adjacent its trailing face). The internal sidewall structure utilized in such a machine will be provided by a hollow shell member having a circular external configuration and an internal configuration that corresponds substantially to the external configuration of the rotor assembly, but is of enlarged dimensions. As a result, the rotor member and the shell member will matingly interengage during their concurrent rotation.

The core member employed in the machine of the invention will advantageously comprise an outer tubular section and a smaller, inner tubular section, generally coaxially disposed within and spaced from the outer section so as to cooperatively form an inter-tubular passage therebetween. The outer tubular section will have an opening circumscribing about two-thirds of the peripheral length thereof, so as to provide the surface orifice described hereinabove. The inner tubular section will have an opening that is in fluid flow communication with the orifice of the outer tubular section throughout about only half of its length, with the intertubular passage being in independent fluid flow communication with the same orifice throughout the remainder of its length.

Other objects of the invention are attained by the provision of an engine system comprising a power unit and a fluid compression unit, both as described herein. In such systems one of the passages of the core member of the fluid compression unit will be operatively connected to a passage of the power unit core member, so as to supply fluid under pressure to the power unit; the system will preferably comprise a plurality of power units, all of which may be operatively connected (for fluid supply) to the same compression unit. It will usually be beneficial to employ two or more power units in any system embodying the invention (which may or may not include a fluid compression unit), and the power units will most desirably be arranged in tandem, with all of their core members being provided as a single core member unit.

BRIEF DESCRIPTION OF THE DRAWINGS

FIG. 2 is a fragmentary, diagrammatic sectional view of a distributor core member suitable for use in cooperation with a battery of axially aligned power units in the engine system depicted in FIG. 1;

FIGS. 3A through 3D are sectional views taken along lines 3A—3A, 3B—3B, 3C—3C and 3D—3D of FIG. 2, respectively;

FIG. 4 is a fragmentary sectional view showing the inner tubular component utilized in the core member of FIG. 2;

FIG. 5 is a fragmentary sectional view of the outer tubular component utilized in the core member;

FIG. 6 is a sectional view showing a spacer subassembly utilized in the core member, oriented as in the far-left section of the core member (encompassing section line 3A—3A of FIG. 2);

FIG. 7 is a sectional view of the spacer assembly, as viewed from along line 3A—3A of FIG. 2;

FIG. 8 is a diagrammatic, sectional view of an alternative form of vane member suitable for use in the units of the engine system shown in FIG. 1;

DETAIL DESCRIPTION OF THE PREFERRED AND ILLUSTRATED EMBODIMENTS

Figure 1:
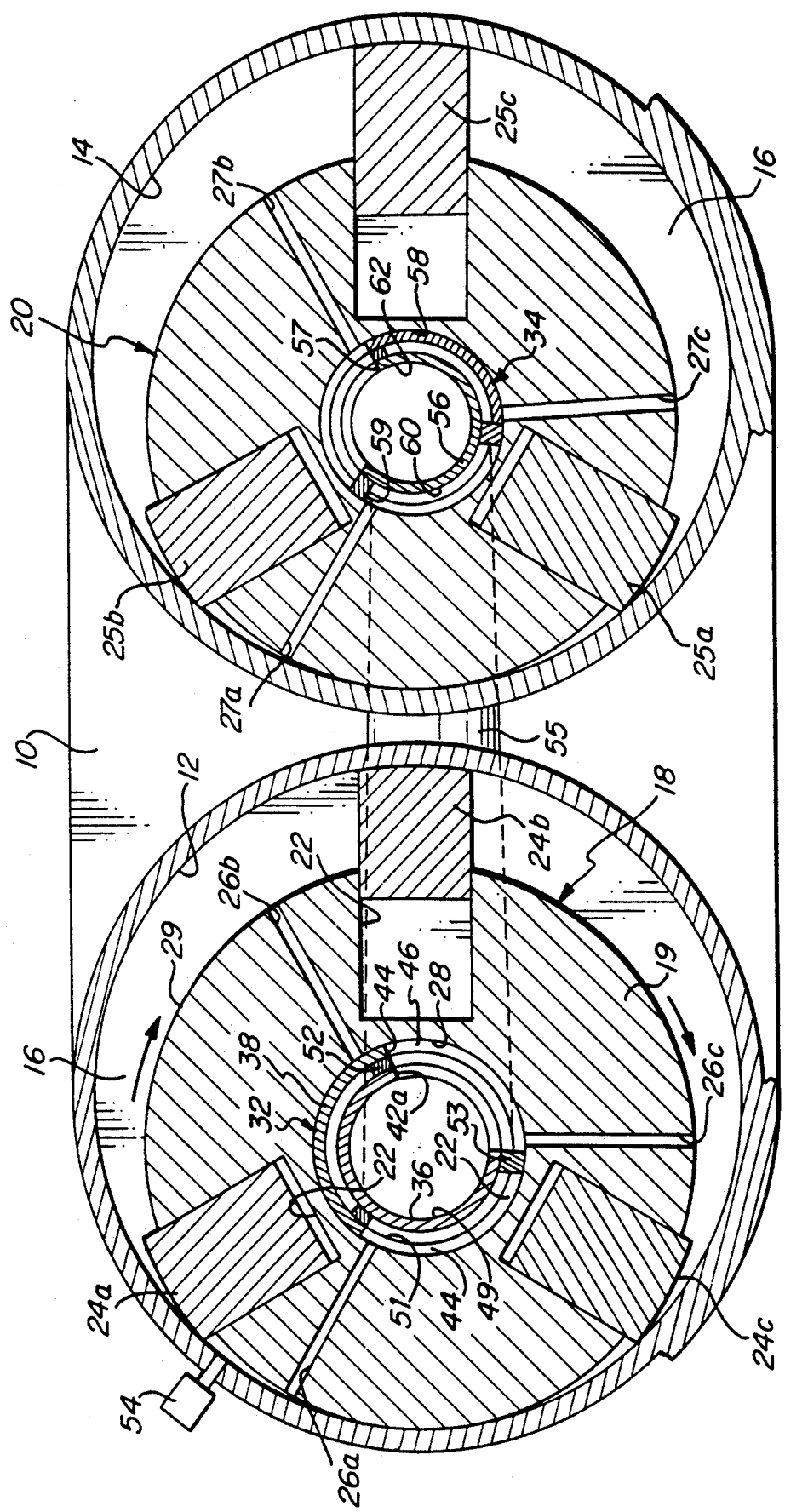
FIG. 1 is a diagrammatic, sectional view showing an engine system embodying the present invention.

Turning initially to FIG. 1 of the appended drawings, therein illustrated is an engine system embodying the present invention, consisting of a cylinder block 10 within which are formed two cylindrical cavities 12 and 14, each of which is closed at its opposite ends by a plate 16 (only one end plate of each cavity is visible in the Figure). Rotor assemblies, generally designated by the numerals 18 and 20, are disposed within the two cavities 12 and 14, respectively. As depicted herein, the mechanism comprising cavity 12 constitutes a power unit of the system, whereas that comprising cavity 14 constitutes a compressor unit.

The rotor assembly 18 consists of a body 19 having an internal surface 28 defining a cylindrical bore therethrough, and a cylindrical external surface 29. Three slots 22 extend axially along the length of the body 19 and at equiangularly (i.e., 120°) spaced locations thereabout. An elongated vane 24 is slidably seated within each of the slots 22, and extends along the length thereof, between the opposite end walls 16. The slots 22 and vanes 24 are of generally rectangular cross section, taken in a plane in which lies the axis of the body bore. Also formed into the body 19, at equiangularly spaced locations thereabout, are three ducts 26, which extend between the internal and external surfaces 28 and 29.

With particular reference now to FIGS. 2-7, the distributor core member 32 employed in the power unit of the engine system is more fully illustrated, and is seen to consist of an inner tubular component 36 of circular cross section, a larger diameter, concentrically disposed outer tubular component 38, a multiplicity of spacer subassemblies, generally designated by the numeral 40, and a plug element 41 closing one end. The core member depicted is adapted for use with a battery of four power units, arranged in tandem (i.e., coaxially aligned, one behind another), and consequently is constructed to have four zones of operation along its length.

In the inner component 36, the operating zones are characterized by the four rectangular openings 42, each encompassing an angle of about 120° on the circumference of the tube 36. The openings 42 are sequentially displaced longitudinally, as well as angularly from one another by 30°; thus, at the location depicted in FIG. 3A the opening 42a may be regarded to extend throughout an arc from 150° to 270° (taking the "9 o'clock" position as 0°/360°; the opening 42b, depicted in FIG. 3B, may be regarded to extend throughout an arc from 180° through 300°; opening 42c may be regarded to extend from 210° through 330°; and opening 42d may be regarded to extend through an arc from 240° to 360° (or 0°).

The outer tube 38 has four corresponding zones, each characterized by a series of four slots 44 extending circumferentially through an angle of 210°; sequential sets of slots are similarly offset an angle of 30°. Thus, the slotted portion at the zone depicted in FIG. 3A may be regarded to extend through an arc from 165° through 15°; the slotted portion depicted in FIG. 3B may be regarded to extend from the 195° position to the 45° position; the portion shown in FIG. 3C may be regarded to extend from 225° to 75°; and that depicted in FIG. 3D may be regarded to extend from 255° to 150°. The slots serve to course to permit fluid flow through the wall of the tube 38; the semicircular rib elements 46 that are formed therebetween serve to afford increased bearing support for the rotor assembly 18, positioned thereover.

Each of the spacer subassemblies 40 consists of a pair of C-shaped elements 50, connected by two crosspieces 52 and a single crosspiece 53, the difference therebetween residing in the greater width (in a radial sense) of the crosspiece 53 and the presence therein of indentations 47 to receive the elements 46. The cross pieces 52, 53 are angularly spaced by about 120° from one another and, as best seen in FIGS. 3A through 3D, the spacer subassemblies 40 are sequentially oriented in the four zones of the core member with 30° angular offsets from one another. In all instances, one of the crosspieces 52 is disposed adjacent one of the longitudinal edges of the associated rectangular opening 42 of the inner tube 36, and the indented crosspiece 53 lies adjacent the opposite edge. The latter extends into the slots 44 (receiving the rib elements 46 in notches 47) to divide the openings provided by the slots 44 into two arcuate portions, only one of which portions communicates with the corresponding inner tube opening 42. Consequently, one half of the slotted opening communicates with the axial passage 49 through the inner tubular component 36, and the other half communicates with an inter-tubular space 51 defined between the two components 36 and 38. Because the C-shaped elements 50 of the spacer subassemblies 40 extend through only 240°, and because the subassemblies are offset from one another by 30°, it will be appreciated that the spaces 51 intercommunicate from zone-to-zone, thus providing a continuous passage along the entire length of the core member.

Operation of the power unit of the engine system will readily be understood, particularly with reference to FIG. 1. The rotor body 19 is of course disposed in the cavity 12 to rotate about the core member 32, which is affixed (by means not shown) to extend on an axis parallel to, but offset from, the axis of the cavity; i.e., the core member 32 and the rotor assembly 18 are disposed eccentrically in the cavity 12. Injection device 54 communicates with the cavity 12, and serves to supply fuel (and optionally a spark for ignition, depending upon the nature of the fuel used) to the unit. The inter-tubular passage (comprised of the spaces 51) is connected by a conduit 55 to the compressor unit of the system (the construction and operation of which will be described hereinbelow), and the passage 49 serves as an exhaust conduit.

In the relationship depicted in FIG. 1, air supplied to the inter-tubular passage may flow from space 51 through the duct 26a, so as to enter the space adjacent the trailing side (taken in a rotational sense) of the vane 24a. Slight rotation of the rotor assembly from the position depicted will bring the inner end of the duct 26a into registry with the surface of the outer tube 38 of the core member 32, thereby effectively sealing it and closing the space behind the vane 24a. The combustion of fuel injected from the device 54 will produce (with or without sparking) an explosive force acting upon the face of the vane 24a, thereby driving the rotor assembly 18 in the clockwise direction.

The previously-closed duct 26b will thereupon come into registry with the proximal half of the slot opening 44, permitting the gaseous combustion products (generated within the space between the vanes 24a and 24b by the preceding explosion) to be exhausted through the opening 42 in the inner tube 36. Simultaneously, the third duct 26c will have come into registry with the distal half of the slot opening 44, beyond the element 53, thereby permitting compressed air to flow into the space between the vanes 24b and 24c. Needless to say, the cycle of ignition, combustion, exhaust, and air intake occurs continuously, and with three repetitions for each rotation of the rotor assembly.

In the embodiment of FIG. 1, contact between the end portions of the vanes 24 and the inside wall defining the chamber 12 is achieved through centrifugal force, albeit that other means (as will be described hereinbelow) may be preferred; the requisite centrifugal force will be developed upon starting of the power unit from a standing condition. Because of the eccentricity that exists between the rotor assembly 18 and the cylinder cavity 12, however, it will be noted that the ends of the vanes 24 make full surface contact with the cavity wall in only two positions, i.e., when the vanes are aligned on the axis between the centers of the rotor assembly and the cavity. A compensating structure is illustrated in FIG. 8, wherein the vane, generally designated by the numeral 24', has a hollow body 64 with a semicylindrical recess 66 formed into its outer end portion. The contact element 68 has a mating semicylindrical inner portion, which is slidably seated in the recess 66 for oscillation about a transverse axis (i.e., an axis normal to the drawing page). This permits the bearing surfaces 70 on the element 68 to follow the surface contour of the cavity 12, maintaining contact despite tangency variations that occur during eccentric rotation.

Referring again to FIG. 1, it will be evident that the compressor unit of the engine system operates on much the same principles as the power unit. The rotor assembly 20 is of course driven, as by operative connection to the power unit rotor 18 using gearing or other power-transmission means, not shown. The inner tubular component 56 and the outer tubular component 58 of the compressor distributor core member 34 define an inter-tubular passage 60, which is connected by conduit 55 to the inter-tubular passage formed between components 36 and 38 of the power unit core member 32; a passage 62 extends through the inner component 56, and functions as a fresh air intake conduit. It will be appreciated that the core member 34 may be provided as an extension of the core member 32, for coaxial assembly of the power and compressor units, if so desired.

In the depicted position of the rotor assembly 20, air compressed between the vanes 25a and 25b has been substantially fully discharged through the duct 27a and the proximal half (in the sense of clockwise movement of the rotor) of a slot opening 59 in the outer tube 58 (formed as hereinabove described with references to outer tube 38 of the power unit distributor), into the inter-tubular passage 60, through the conduit 55 and thence into the space 51 of the power unit core member. Due to the vacuum generated by enlargement of the volume between the vanes 25b and 25c as the assembly rotates, air is simultaneously drawn from the intake passage 62, through the inner tube opening 57 (which is of a form comparable to opening 42 of tube 36) and the distal half of the outer tube slot opening 59, and thereafter through the duct 27b and into the defined space.

At the same time, and with the inner end of the duct 27c sealed against the outside surface of the tubular component 58, air drawn previously into the space between the vanes 25c and 25a has undergone compression. It can be seen that a slight degree of rotation of the rotor assembly 20 will open the duct 27c to the passage 60, for delivery of the compressed air to the power unit. The same movement will simultaneously open the duct 27a to the air intake passage 62, and will close the duct 27b so as to commence compression of air trapped between the vanes 25b and 25c.

Figure 9:
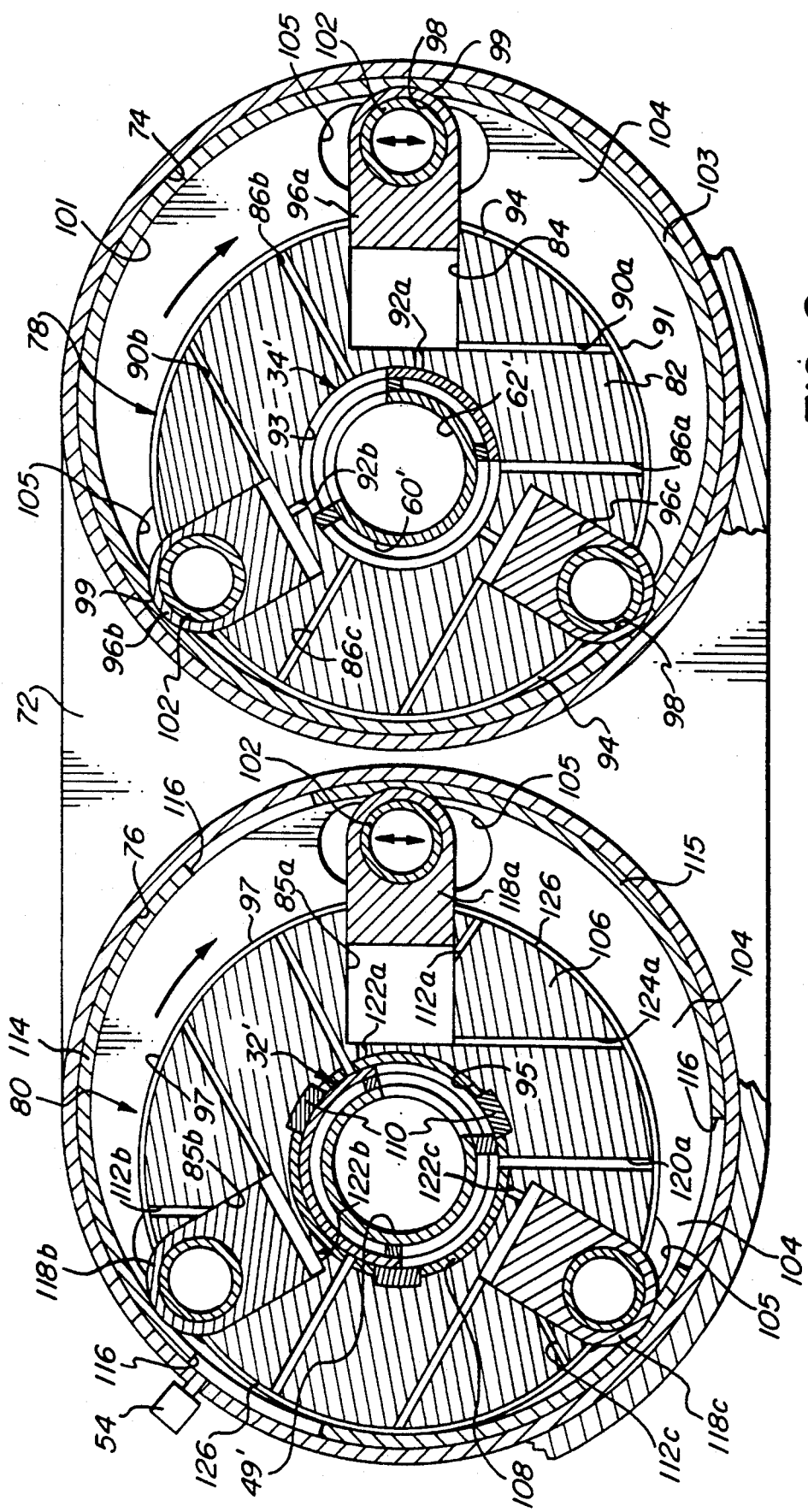
FIG. 9 is a view similar to that of FIG. 1, depicting a preferred embodiment of a system of the invention, and of the power and compressor units thereof.
Figure 10:
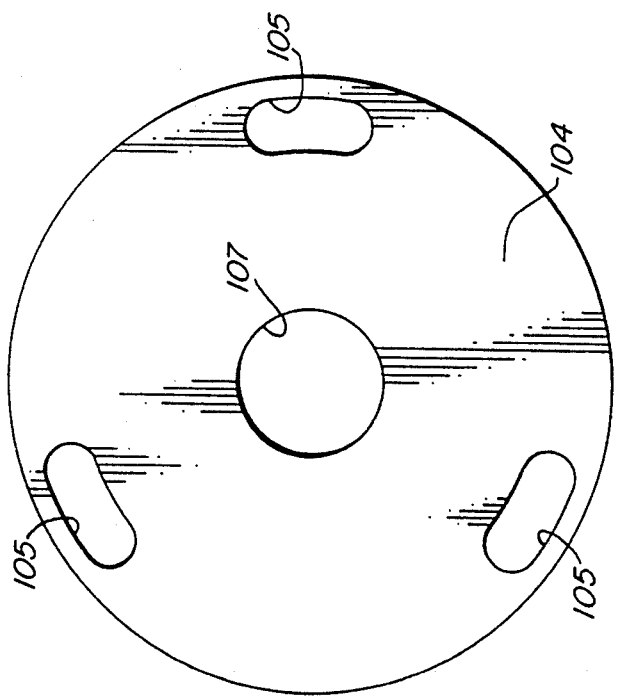
FIG. 10 is an elevational view of an end panel used in the units of the preceding Figure.

With reference now to FIGS. 9 and 10 of the drawings, the engine system illustrated is similar to that of FIG. 1, but incorporates features that will be deemed particularly advantageous in many circumstances. The engine block 72 defines two adjacent cavities 74 and 76 of circular cross section, for the compressor unit and the power unit, respectively; rotor assemblies 78 and 80, suitable for those functions, are rotatably disposed within the cavities and are mounted upon fixed distributor core members 34', 32', the construction of each of which is substantially as hereinabove described.

The compressor unit rotor assembly 78 consists of a body 82 having three, equiangularly disposed slots 84 and ducts 86, serving substantially the purposes previously described. In addition, however, body 82 has supplemental ducts 90 and 92 leading from each slot 84 to the outer surface 91, and to the bore-defining surface 93, thereof, respectively; also, a number of grooves 94 (only one of which is visible) extend circumferentially about the body 82 at axially spaced locations, and serve to interconnect the outer ends of the ducts 86 and 90.

Here again, a vane 96 is slidably mounted in each of the slots 84, and extends longitudinally along the entire length of the body 82. Its outer end portion is of circular cross section, providing an arcuate end surface 99 that bears against the inner face 101 of a cylindrical shell member 103, and it has a cylindrical bore 98 through which extends a hollow cylindrical fastener 102. The opposite ends of the fastener 102 are received in slots 105 formed in the disklike end plates 104 (only one of which is visible), which plates 104 are in turn attached to the opposite ends of the shell member 103 to form, in cooperation with the outer surface 91 of the body 82, a closed chamber within the engine block cavity 74. These components (i.e., the end plates 104 and the shell member 103) are mounted for conjoint rotation with the rotor assembly 78, with slots 105 and the arcuate faces 99 permitting not only pivoting but also the limited degree of oscillation or shifting that is necessary to compensate for the eccentricity that exists between the components (the cavity-defining wall is thickened for purposes of illustration, but will in practice be so formed as to allow the necessary vane movement). The disks 104 are more fully illustrated in FIG. 10, and are seen to have the three arcuate slots 105 at equiangularly spaced locations thereabout, and a central hole 107 for receipt of the core member.

Upon rotation of the rotor assembly 78, the vanes 96 will of course serve to define therebetween chamber compartments of dynamically increasing and decreasing volume, in turn serving to draw, compress, and expel air through the core member 34', as hereinabove described with reference to FIG. 1. In this instance, however, because the vanes members are oscillatably connected to the end plates 104 they are caused positively to slide within the slots 84 during rotation, rather than being urged outwardly as a result of only centrifugal force. Moreover, the supplemental ducts 90, 92 enable utilization of the space underlying each vane 96 as an additional chamber for air compression, thereby substantially increasing the effectiveness of the unit for its intended purpose.

More specifically, with the rotor assembly in the position depicted in FIG. 9 air will have been drawn into the space between the adjacent vanes 96a and 96b; also, intake into the space under (radially inwardly of) vane 96b will have commenced by virtue of the indirect and direct connection, respectively, of the ducts 90b and 92b to the passage 62' of the core member 34'. It should be pointed out that the duct 92b connects to the passage 62' through core member openings that are spaced axially from those shown in FIG. 9, and that the period during which air may be drawn therethrough will be controlled (by suitable dimensioning of the communicating opening) as necessary to obtain an optimal amount of filling.

As rotor assembly 78 continues to rotate, supplemental duct 92b will be closed by a solid wall portion of the outer tubular component of the core member 34' (as in the position of duct 92a), so that inward movement of the vane, from the position of vane 96a, will force air through the ducts 90a and 86a, ultimately for delivery via the inter-tubular passage 60' to the power unit of the system.

It will be appreciated that the circumferential channels 94 serve to permit the flow of air from the space formed adjacent the leading face of vane 96c to the space adjacent the trailing face of vane 96b, past the constriction therebetween that results from contact of the rotor body 82 on the inside surface 101 of the cylindrical shell member 103; transferred air is delivered to the inter-tubular passage 60' through the duct 86c. It will also be appreciated that the supplemental ducts 90 may be found superfluous in some instances, since air may be drawn into the spaces underlying the vanes through ducts 92, but not ducts 90, when the ducts 86 are closed (as is the imminent condition of duct 86b in the position illustrated).

The rotor assembly 80 utilized in the power unit of the engine system is generally similar to that of the compression unit. One exception resides however in the provision of a tubular power-transmission sleeve 108 disposed within the central bore of the body 106 and affixed thereto by three splines 110, the splines being engaged within suitable slots and recesses formed into the tube 108 and the bore-defining surface 95. Also, each vane-receiving slot 85 has associated with it a supplemental duct 112, which extends therefrom to the outer surface 97 of the body, and the rotatable shell member 115 is provided with three openings 116 to enable the injection of fuel (and an ignition spark, when provided) from the device 54 into the defined combustion chamber compartment.

At the instant depicted in FIG. 9, air from the compressor unit is starting to flow through the duct 120a of the power unit rotor body 106 into the space between the vanes 118a and 118c. The supplemental duct 122a, leading from the bottom of the slot 85a is, at that time (and for a period of perhaps 15° of rotation) open to the exhaust passage 49' through the inner tubular component of the core member 32', enabling intake air to flow through the ducts 112a and 124a, to thereby clear gaseous combustion products (previously admitted) from under the vane 118a. When the duct 122a is closed (by sealing contact with the surface of the tubular component), the air between vanes 118a and 118c will be compressed and will be transferred, through circumferential channels 126, to the combustion compartment that lies adjacent the trailing face of vane 118b, in the position depicted. Maximum compression will occur when vane 118c attains a position in axial alignment with the centers of the core member 32' and the shell member 115, with ignition, combustion, compression, and exhaust proceeding as hereinabove described.

Figure 11:
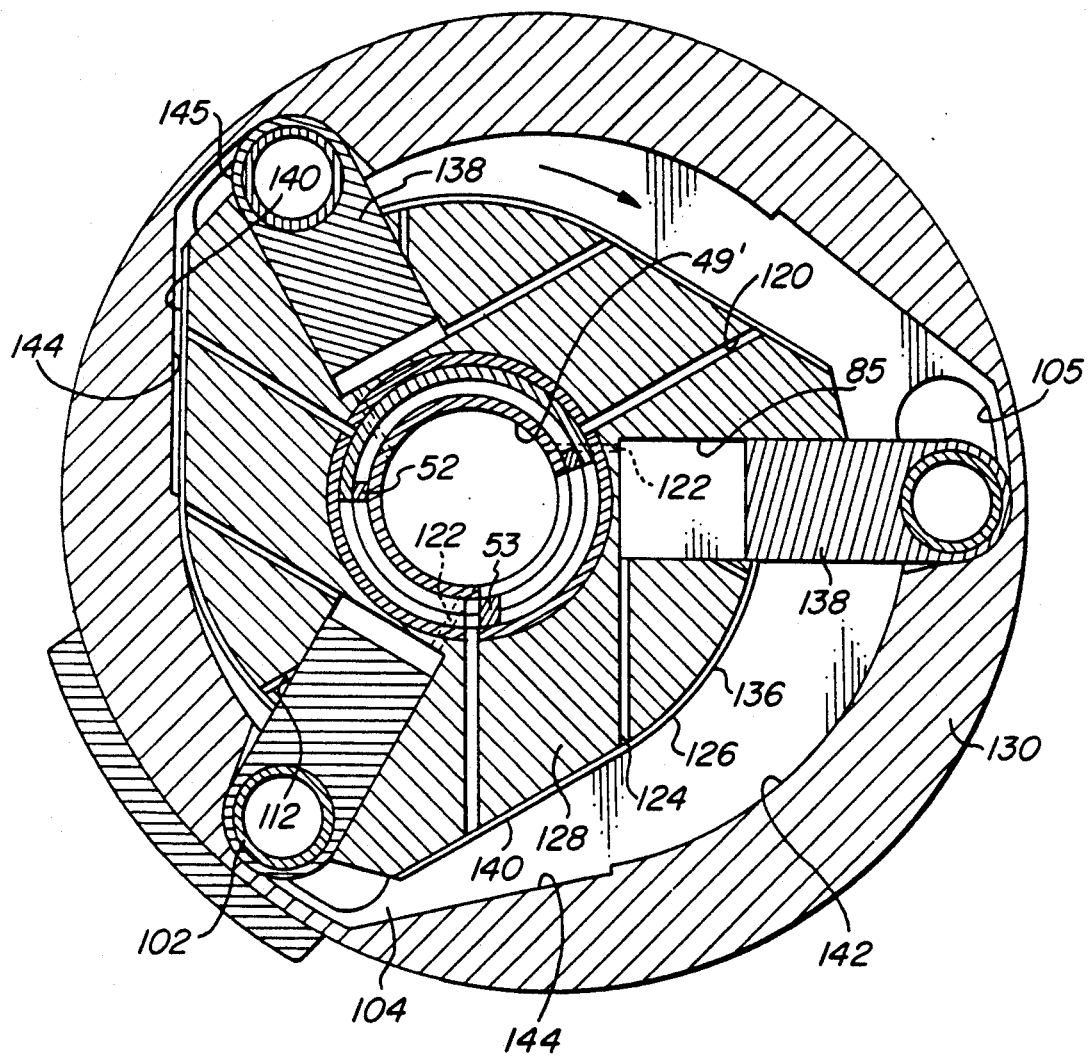
FIG. 11 is a diagrammatic, sectional view showing a further preferred form of power units embodying the invention.

Turning now to FIG. 11 of the drawings, therein illustrated are components suitable for use in a power unit of a system embodying the invention, the rotor body 128 being of trigonal cross section and trilaterally symmetric about its longitudinal axis of rotation. Shell member 130 is coupled to the body 128 for conjoint rotation, and has an internal sidewall structure that is configured to correspond substantially to the external configuration of the rotor assembly, but is of enlarged dimensions; thus, the rotor body 128 and the shell member 130 matingly interengage during rotation. The shell member 130 is also formed with openings (not shown) corresponding to those numbered 116 in the member 115 of FIG. 9, which are axially displaced from the plane on which FIG. 11 is taken.

Each of the three sectors of the rotor body 128 (taken in cross section) includes a generally arcuate outer surface portion 136, commencing proximate the leading face of the adjacent vane 138, and a generally rectilinear outer surface portion 140 that extends tangentially from the surface portion 136 to a point proximate the trailing side of the other adjacent vane. The shell member 130 has corresponding arcuate and rectilinear sections, which provide internal surface portions 142, 144, respectively. The body ducts, circumferential grooves, vane structure, core member structure, etc. are similar to those previously described and correspondingly numbered, and serve the same purpose; therefore, discussion thereof is deemed unnecessary.

Because of the presence of generally planar (taken in two dimensions) surface portions 140 and 144 on the rotor body 128 and the shell member 130, respectively, extended areas exist for reaction to the explosive forces generated therebetween. By augmenting the area that would otherwise be presented to the same forces (i.e., limited substantially to the small exposed area 145 on the trailing face of the vane), much more efficient power utilization is afforded, which in turn greatly enhances the effectiveness and efficiency of the unit.

Figure 12:
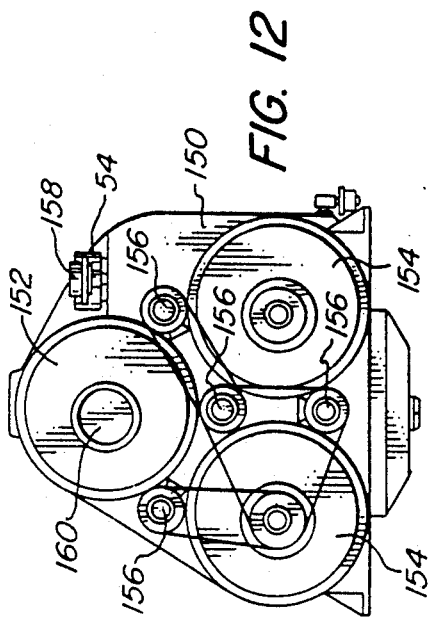
FIGS. 12 and 13 are front and side elevational views of an engine incorporating a system embodying the present invention.
Figure 13:
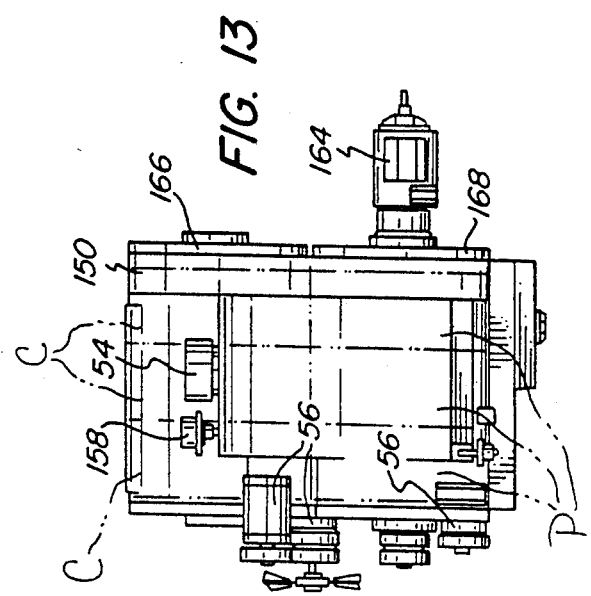

Turning finally to FIGS. 12 and 13 of the drawings, the exterior of an engine system embodying the present invention is diagrammatically illustrated, and indicates one arrangement of power and compressor units suitable for use therein. The system consists of an engine block 150, in which is contained a battery 152 of compressor units "C", and two, side-by-side batteries 154 of power units "P", the units being depicted diagrammatically in phantom line in FIG. 13. It will be appreciated that each battery consists of two or more units of the kind hereinabove described (three in the illustrated system), and that all of the units are appropriately interconnected to provide the necessary supply of compressed air to the power units (as by the conduit 55, in FIG. 1), the necessary means for driving the compressor units, suitable power take-off features, etc. Typical peripheral devices 156 (e.g., an electrical alternator or generator, an air conditioning unit, a water pump, an hydraulic pump) are present on the engine as well, as is a spark-supply device 158, a fuel injector 54, a gas pump and filter unit 162, and an air intake filer 160. An electrical starter motor 164 is also shown in FIG. 13, and housing parts 166 and 168 enclosure gearing for driving the compressor units from the power units.

As indicated above, one of the outstanding benefits that is provided by the rotary machines of the instant invention resides in the ability to readily arrange them as batteries of two or more units rotating about a common core member. It has also been indicated that a single core member may be associated with one or more power units in combination with one or more compressor units, thus providing an integrated, highly compact engine system.

It goes without saying that the power units of a multiple system will be so oriented and timed as to provide the most balanced overall cycle. In a system containing two power units, for example, each having three combustion phases per revolution, they would be arranged to fire alternatively, at 60° intervals, so as to provide six combustion phases for each overall engine cycle. Similarly, a four-unit system would have the power units operationally offset by an angle of 30°, producing twelve combustion phases per engine cycle. Systems embodying the invention can of course utilize more than four units, and in any event multiple units will normally produce overlapping power strokes because of the duration of each explosion phase, thereby affording ultimate smoothness of performance.

Another advantage of using multiple power units resides in the ability to match engine response to demand. For example, under maximum load conditions a control computer could render all of the power units of an engine simultaneously operative, thereafter shutting down one or more of the units when the load is reduced.

It should be appreciated that a single compressor unit, of adequate capacity, may be utilized to supply air to more than one power unit, and that, moreover, appropriate means may be employed to increase the speed of a compressor to produce greater output if so desired, since the compressor and power units of an integrated system may operate at different rates of rotation. On the other hand, it should be appreciated that an engine system embodying the invention need not include any compressor of the nature described; alternative air-supply sources may be preferred in certain cases.

Finally, it is to be noted that many variations may be made in the units and systems described herein without departure from the novel concepts of the invention. For example, in those instances in which a rotatable shell member is employed it need not be driven directly by the rotor assembly, through connection with the vanes. Instead, power may be transmitted by indirect means from the rotor assembly, not only reducing friction as a result but also decreasing stress upon the rotor vanes. Also, it will be appreciated that the size, configuration, location, etc. of the openings, ducts, and passages in the distributor core member and the rotor body may vary so as to afford optimal fluid flow characteristics, and that the distributor member may advantageously be of one-piece construction. Other modifications, within the scope of the appended claims, will readily occur to those skilled in the art.

Thus, it can be seen that the present invention provides a novel rotary internal combustion engine, and a novel engine system comprising the same, by which increased power output and efficiency, together with improved operating characteristics, are afforded. The size, weight, complexity, and lubrication and maintenance requirements of the engine and system of the invention are relatively low, and yet high levels of smoothness of operation and flexibility of use may be realized. The invention also provides a novel compressor unit that operates in a very effective and efficient manner, and that is similarly advantageous from standpoints of size, weight, complexity, etc. The foregoing features and advantages are provided, moreover, in units and a system that employ relatively few moving parts, and that are relatively inexpensive and facile to manufacture.

Having thus described the invention, what is claimed is:

1. A rotary machine, functional as a power unit or a fluid compression unit, comprising: a stator body having a cylindrical cavity therewithin; internal sidewall structure and end wall structure defining a closed chamber within said cavity; a rotor assembly rotatably mounted within said stator body, comprised of an elongate rotor body having a central, longitudinal axis of rotation along which extends, through said rotor body, a bore of circular cross section, and three vane members extending longitudinally along said rotor body at equiangularly spaced locations thereabout, and mounted to extend beyond the outer surface of said rotor body, between said chamber-defining end wall structures, and for slidable movement radially with respect to said longitudinal axis of said rotor body, said vane members effectively dividing said rotor body longitudinally into three substantially identical sectors, and having outer end portions that engage said internal sidewall structure to divide said chamber into three compartments, each compartment having a volume that varies cyclically as said rotor assembly rotates within said stator body; and an elongate distributor core member of generally circular cross section received within said bore of said rotor body and supported to enable rotation of said rotor assembly thereabout, said axis of rotation being parallel to and offset from the longitudinal axis of said stator body cavity so as to dispose said rotor body and said core member eccentrically with respect to said cavity, said rotor body having at least one duct extending through each of said sectors thereof and providing fluid flow communication between said rotor body bore and said chamber, each of said ducts having an inner end opening on a surface defining said bore and an outer end opening on said rotor body outer surface, said core member defining two discrete passages and including an outer, generally cylindrical surface portion in contact with said inner surface of said rotor body and effectively closing said inner ends of said ducts when in registry therewith, said outer wall surface portion being discontinuous, so as to provide an orifice of circumferential extent disposed for registry with said inner ends of said ducts, and said core member having internal structure defining said passages and isolating them from one another, and establishing communication between said orifice and both of said passages, independently.

2. The machine of claim 1 wherein said internal sidewall structure is fixed within said stator body, wherein said closed chamber comprises said cylindrical cavity, and wherein said outer end portions of said vane members slidably engage the inner surface of said sidewall structure during rotation of said rotor assembly.

3. The machine of claim 1 wherein said internal sidewall structure is provided by a hollow shell member that is rotatably mounted within said stator body cavity, and wherein said outer end portions of said vane members are operatively, pivotably attached to said shell member to couple said shell member and said rotor assembly for conjoint rotation.

4. The machine of claim 1 wherein said vane members are freely slidable within said rotor body.

5. The machine of claim 4 additionally including means for biasing said vane members outwardly of said rotor body.

6. The machine of claim 5 wherein said rotor body has formed thereinto a plurality of sockets for slidably mounting said vane members, wherein the surfaces defining said sockets and the inner ends of said vane members form pneumatic chambers, and wherein said rotor body has at least one supplemental duct leading from said outer surface thereof to each of said pneumatic chambers for providing fluid under pressure thereto and thereby providing said means for biasing.

7. The machine of claim 1 wherein said rotor body has formed thereinto a plurality of sockets for slidably mounting said vane members, wherein the surfaces defining said sockets and the inner ends of said vane members form pneumatic chambers, and wherein said rotor body has at least one supplemental duct leading from said outer surface thereof to each of said pneumatic chambers, inward movement of said vane members serving to compress fluid contained within said pneumatic chambers for discharge through said supplemental ducts.

8. The machine of claim 1 wherein said rotor body is of trigonal cross section and is trilaterally symmetric about said longitudinal axis thereof, each of said sectors of said rotor body including, in cross section, a first outer surface portion, commencing proximate one of said vane members, and a generally rectilinear second outer surface portion extending therefrom to a point proximate the adjacent vane member; and wherein said internal sidewall structure is provided by a hollow shell member having an external configuration of circular cross section, said internal sidewall structure having a configuration corresponding substantially to the external configuration of said rotor assembly, but of enlarged dimensions, so as to enable said rotor member and said shell member to matingly interengage during concurrent rotation thereof.

9. The machine of claim 8 wherein said first outer surface portion is generally arcuate, with said second outer surface portion extending tangentially from it.

10. A rotary machine, functional as a power unit or a fluid compression unit, comprising: a stator body having a cylindrical cavity therewithin; internal sidewall structure and end wall structure defining a closed chamber within said cavity; a rotor assembly rotatably mounted within said stator body, comprised of an elongate rotor body having a central, longitudinal axis of rotation along which extends, through said rotor body, a bore of circular cross section, and three vane members extending longitudinally along said rotor body at equiangularly spaced locations thereabout, and mounted to extend beyond the outer surface of said rotor body, between said chamber-defining end wall structures, and for slidable movement radially with respect to said longitudinal axis of said rotor body, said vane members effectively dividing said rotor body longitudinally into three substantially identical sectors, and having outer end portions that engage said internal sidewall structure to divide said chamber into three compartments, each compartment having a volume that varies cyclically as said rotor assembly rotates within said stator body; and an elongate distributor core member of generally circular cross section received within said bore of said rotor body and supported to enable rotation of said rotor assembly thereabout, said core member comprising an outer tubular section, and a smaller inner tubular section generally coaxially disposed within said outer section, said axis of rotation being parallel to and offset from the longitudinal axis of said stator body cavity so as to dispose said rotor body and said core member eccentrically with respect to said cavity, said rotor body having at least one duct extending through each of said sectors thereof and providing fluid flow communication between said rotor body bore and said chamber, each of said ducts having an inner end opening on a surface defining said bore and an outer end opening on said rotor body outer surface, said core member defining two discrete passages and including an outer, generally cylindrical surface portion in contact with said inner surface of said rotor body and effectively closing said inner ends of said ducts when in registry therewith, said outer wall surface portion being discontinuous, so as to provide an orifice of circumferential extent disposed for registry with said inner ends of said ducts, and said core member having internal structure defining said passages and isolating them from one another, and establishing communication between said orifice and both of said passages, independently, spacing between said outer and inner tubular sections forming, as one of said passages, an inter-tubular passage, the other of said passages extending through said inner tubular section, said outer tubular section providing said outer wall surface portion, the orifice of which circumscribes about two-thirds of the peripheral length of said outer tubular section, said inner tubular section having an opening in fluid flow communication with said orifice of said outer tubular section throughout about only half of the length of said orifice, and said inter-tubular passage being in fluid flow communication with said orifice throughout the remainder of said orifice length.

11. An engine system comprising a power unit and a fluid compression unit, each of said units comprising a rotary machine including: a stator body having a cylindrical cavity therewithin; internal sidewall structure and end wall structure defining a closed chamber within said cavity; a rotor assembly rotatably mounted within said stator body, comprised of an elongate rotor body having a central, longitudinal axis of rotation along which extends, through said rotor body, a bore of circular cross section, and three vane members extending longitudinally along said rotor body at equiangularly spaced locations thereabout, and mounted to extend beyond the outer surface of said rotor body, between said chamber-defining end wall structures, and for slidable movement radially with respect to said longitudinal axis of said rotor body, said vane members effectively dividing said rotor body longitudinally into three substantially identical sectors, and having outer end portions that engage said internal sidewall structure to divide said chamber into three compartments, each compartment having a volume that varies cyclically as said rotor assembly rotates within said stator body; and an elongate distributor core member of generally circular cross section received within said bore of said rotor body and supported to enable rotation of said rotor assembly thereabout, said axis of rotation being parallel to and offset from the longitudinal axis of said stator body cavity so as to dispose said rotor body and said core member eccentrically with respect to said cavity, said rotor body having at least one duct extending through each of said sectors thereof and providing fluid flow communication between said rotor body bore and said chamber, each of said ducts having an inner end opening on a surface defining said bore and an outer end opening on said rotor body outer surface, said core member defining two discrete passages and including an outer, generally cylindrical surface portion in contact with said inner surface of said rotor body and effectively closing said inner ends of said ducts when in registry therewith, said outer wall surface portion being discontinuous, so as to provide an orifice of circumferential extent disposed for registry with said inner ends of said ducts, and said core member having internal structure defining said passages and isolating them from one another, and establishing communication between said orifice and both of said passages, independently; one of said passages of said core member of said fluid compression unit being operatively connected to one of said passages of said core member of said power unit so as to enable said compression unit to provide fluid under pressure to said power unit.

12. The engine system of claim 11 comprising a plurality of said power units, said one passage of said core member of each of said power units being operatively connected to said one passage of said compression unit core member.

13. The engine system of claim 12 wherein said power units are arranged in tandem, and wherein said core members of all of said tandem power units are provided as a single core member unit.

14. An engine system comprising a plurality of power units, each comprising a rotary machine including: a stator body having a cylindrical cavity therewithin; internal sidewall structure and end wall structure defining a closed chamber within said cavity; a rotor assembly rotatably mounted within said stator body, comprised of an elongate rotor body having a central, longitudinal axis of rotation along which extends, through said rotor body, a bore of circular cross section, and three vane members extending longitudinally along said rotor body at equiangularly spaced locations thereabout, and mounted to extend beyond the outer surface of said rotor body, between said chamber-defining end wall structures, and for slidable movement radially with respect to said longitudinal axis of said rotor body, said vane members effectively dividing said rotor body longitudinally into three substantially identical sectors, and having outer end portions that engage said internal sidewall structure to divide said chamber into three compartments, each compartment having a volume that varies cyclically as said rotor assembly rotates within said stator body; and an elongate distributor core member of generally circular cross section received within said bore of said rotor body and supported to enable rotation of said rotor assembly thereabout, said axis of rotation being parallel to and offset from the longitudinal axis of said stator body cavity so as to dispose said rotor body and said core member eccentrically with respect to said cavity, said rotor body having at least one duct extending through each of said sectors thereof and providing fluid flow communication between said rotor body bore and said chamber, each of said ducts having an inner end opening on a surface defining said bore and an outer end opening on said rotor body outer surface, said core member defining two discrete passages and including an outer, generally cylindrical surface portion in contact with said inner surface of said rotor body and effectively closing said inner ends of said ducts when in registry therewith, said outer wall surface portion being discontinuous, so as to provide an orifice of circumferential extent disposed for registry with said inner ends of said ducts, and said core member having internal structure defining said passages and isolating them from one another, and establishing communication between said orifice and both of said passages, independently; said power units being arranged in tandem and said core members thereof constituting a single core member unit.

* * * * *